(12) United States Patent
Yang

(10) Patent No.: US 7,841,615 B2
(45) Date of Patent: Nov. 30, 2010

(54) FOLDABLE TELESCOPE GOLF CART HAVING A BALANCING MECHANISM

(75) Inventor: David Yang, Moraga, CA (US)

(73) Assignee: Ue-Ming Yang, Chicago, IL (US)

( * ) Notice: Subject to any disclaimer, the term of this patent is extended or adjusted under 35 U.S.C. 154(b) by 459 days.

(21) Appl. No.: 11/189,960

(22) Filed: Jul. 27, 2005

(65) Prior Publication Data
US 2007/0024030 A1    Feb. 1, 2007

(51) Int. Cl.
*B62B 1/20*    (2006.01)
(52) U.S. Cl. .................. 280/652; 280/DIG. 6
(58) Field of Classification Search ........... 280/639, 280/645, 651, 652, 659, 38, 40, DIG. 6
See application file for complete search history.

(56) References Cited

U.S. PATENT DOCUMENTS

| | | | | |
|---|---|---|---|---|
| 2,406,183 A | * | 8/1946 | Allen | 280/655 |
| 3,100,048 A | * | 8/1963 | Halverson | 211/2 |
| 3,580,533 A | * | 5/1971 | Nordland | 248/96 |
| 4,657,100 A | * | 4/1987 | Lewis | 180/19.1 |
| 5,354,089 A | * | 10/1994 | Sohrt et al. | 280/645 |
| 5,667,239 A | * | 9/1997 | Yang | 280/646 |
| 6,099,020 A | * | 8/2000 | Liao | 280/643 |
| 6,685,214 B2 | * | 2/2004 | Gregory | 280/652 |

\* cited by examiner

*Primary Examiner*—Frank B Vanaman

(57) ABSTRACT

A swing arm assembly becomes a balancing mechanism for a foldable telescope golf cart. The swing arm assembly adjusts the inclined angle of the golf beg on the golf cart, and thus adjusts the location of the center of gravity of the cart. The golf cart is maintained in a balanced state when the center of gravity falls upon the centerline of the cart wheels. The golf cart and swing arm assembly can be converted from compact size to full size, or vice versa, by a single action.

7 Claims, 6 Drawing Sheets

US 7,841,615 B2

FOLDABLE TELESCOPE GOLF CART HAVING A BALANCING MECHANISM

BACKGROUND OF THE INVENTION

A foldable telescope golf cart is characterized by its ability to be folded to a compact size during storage. It is unfolded to a full size for carrying a golf bag and golf clubs during traveling. In U.S. Pat. No. 5,667,239, Yang claims an adjustable balancing mechanism for positioning the center of gravity of the cart including the golf bag and golf clubs in line with the cart wheels. As a result, the cart is maintained in a balanced state that does not impose the weight of cart including golf bag and golf clubs upon the golfer. The balancing mechanism has a swing arm assembly pivotally connected to the cart frame. However, there is a drawback of such a balancing mechanism because the golfer needs to take an extra step to assemble or disassemble the balance mechanism when converting the cart from the compact size to the full size, or vice versa.

Therefore, there is a need to improve Yang's balancing mechanism so that the golf cart and the balancing mechanism can be converted from the compact size to the full size, or vice versa, by a single action.

OBJECTS AND SUMMARY OF THE INVENTION

The object of the present invention is to provide a foldable telescope golf cart with a balancing mechanism, which allows the center of gravity of the cart including the golf bag and golf clubs to fall upon the centerline of the cart wheels in a balanced state.

Another object of the present invention is to provide such a balancing mechanism that allows the cart and the balancing mechanism to be converted from the compact size to the full size, or vice versa, by a single action.

DETAILED DESCRIPTION OF PREFERRED EMBODIMENTS OF THE INVENTION

Figure 1:
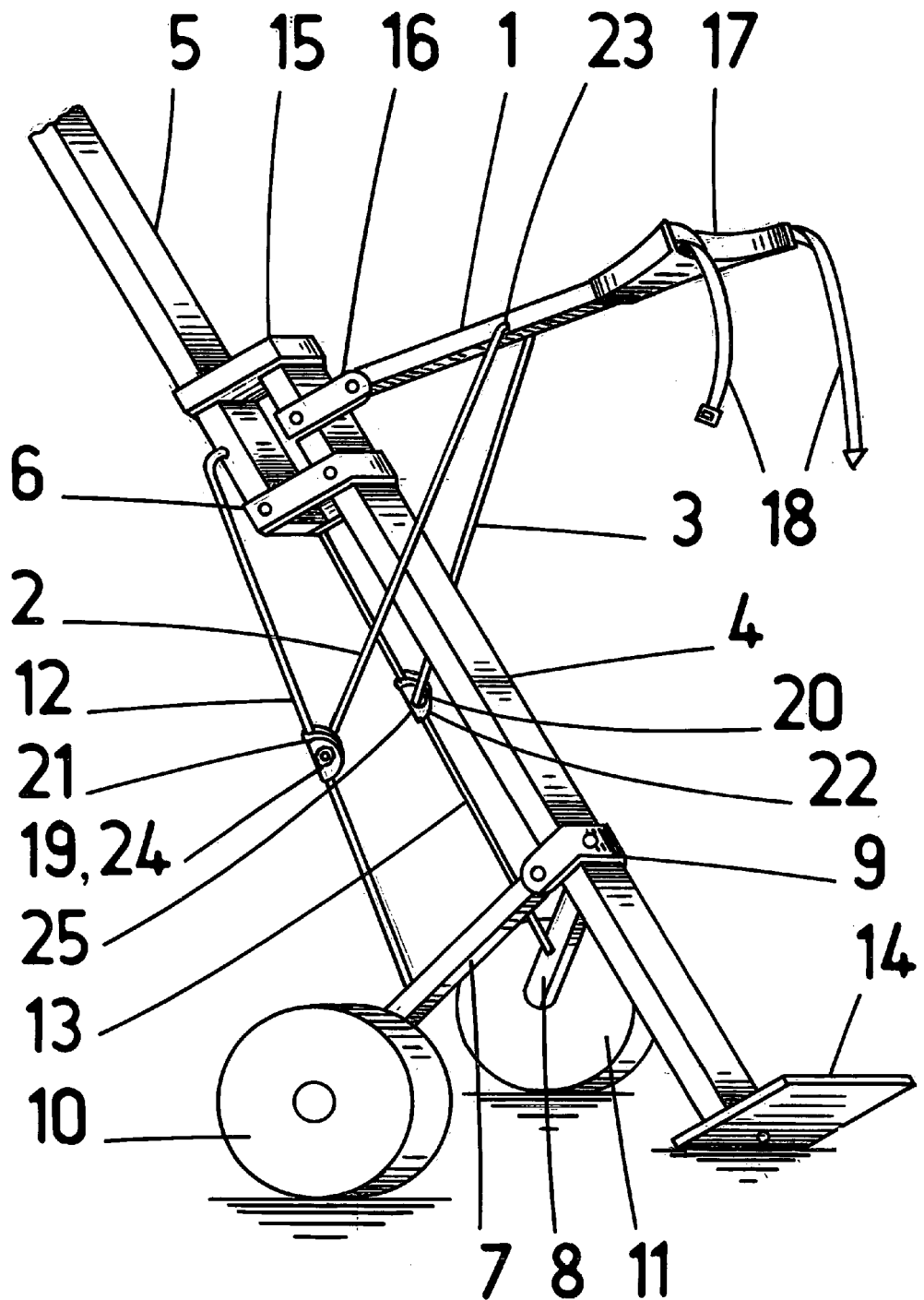
FIG. 1 is an isometric view of the foldable telescope golf cart of the first preferred embodiments of present invention in a full size and standing position.
Figure 2:
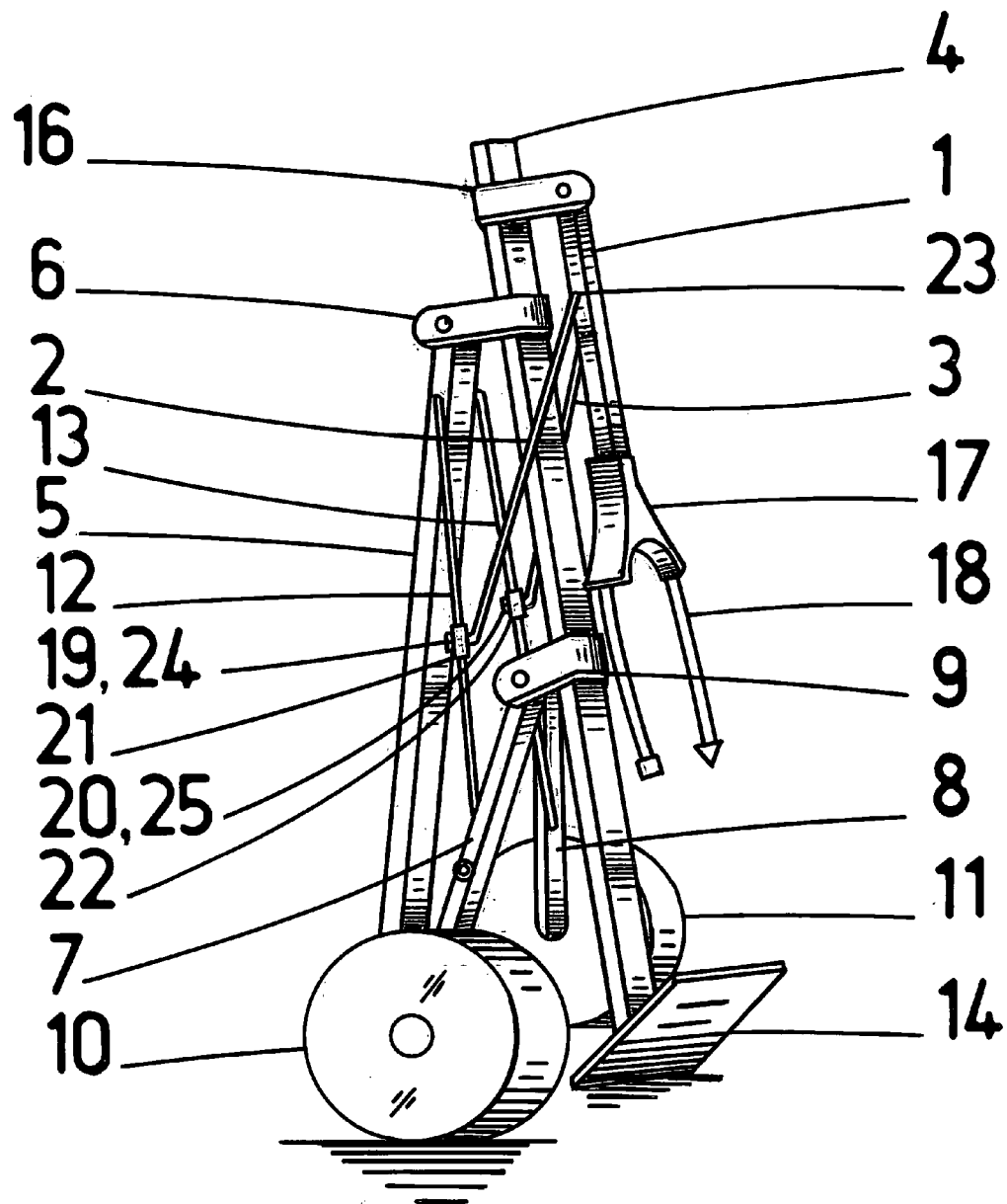
FIG. 2 is an isometric view of the foldable telescope golf cart of the first preferred embodiments of present invention in a compact size and standing position.

FIG. 1 and FIG. 2 show a standing foldable telescope golf cart having the balancing mechanism of the first preferred embodiments of present invention in full and compact sizes respectively. The key elements of the balancing mechanism consist of a swing arm 1, and a pair of connecting rods 2 and 3. The balancing mechanism is incorporated into a golf cart that comprises of a lower cart frame 4, a upper cart frame 5, a mounting bracket 6 that pivotally connects the lower and upper cart frames 4 and 5, a pair of wheel frames 7 and 8, another mounting bracket 9 that pivotally connects the wheel frames 7 and 8 to the lower cart frame 4, a pair of wheels 10 and 11, a pair of connecting rods 12 and 13 that connect the upper cart frame 5 to the wheel frames 7 and 8 respectively, a plate 14 attached to the lower end of the lower cart frame 4 for supporting the golf beg, and a sliding bracket 15 slidably mounted to the upper cart frame 5. The sliding bracket 15 locks the upper cart frame 5 and the lower cart frame 4 in an extended telescope form while the cart being converted to a full size. The connecting rods 12 and 13 provide linkages to convert the golf cart from compact size to full size while rotating the upper cart frame 5 upward and away from the lower cart frame 4. After releasing the sliding bracket 15 from its locked position by moving the sliding bracket 15 upward, the connecting rods 12 and 13 provide linkage to convert the golf cart from full size to compact size while rotating the upper cart frame 5 downward and toward the lower cart frame 4. It is understood that the balancing mechanism of present invention can be incorporated into various foldable telescope golf carts in prior art that are similar to the one as described above. It is not the intent of FIG. 1 and FIG. 2 to show the details of the existing parts of the cart, nor to cover the details of all various golf carts in prior art.

In the balancing mechanism of present invention, an end of the swing arm 1 is pivotally connected to the lower cart frame 4 by a mounting bracket 16. Another end of the swing arm 1 is fixedly connected to a saddle 17 for supporting the golf bag. The saddle 17 is provided with a belt 18 that fastens the golf bag to saddle 17. As a result, swing arm 1 can not rotate freely while the golf bag is fastened to saddle 17. The lower ends of connecting rods 2 and 3 are bent horizontally that penetrate through holes 19 and 20 in rod fittings 21 and 22 respectively. The upper ends of connecting rods 2 and 3 are bent horizontally that penetrate a though a hole 23 in mid section of swing arm 1. The rod fittings 21 and 22 are fixedly mounted to the mid sections of connecting rods 12 and 13 respectively. Alternatively, the rod fittings 21 and 22 can be the integral parts of connecting rods 12 and 13 respectively. The rod fittings 21 and 22 form the rotational joints that connect the lower ends of connecting rods 2 and 3 to the connecting rods 12 and 13 respectively. The through hole 23 forms a rotational joint that connects the upper ends of connecting rods 2 and 3 to the swing arm 1. The lower ends of connecting rods 2 and 3 are threaded so that nuts 24 and 25 respectively can be installed to prevent connecting rods 2 and 3 from sipping out of holes 19 and 20 respectively. Alternatively, the connecting rods 2 and 3 can be fabricated from a single rod. The balancing mechanism of present invention is capable of shifting the center gravity of the golf cart forward by means of decreasing an incline angle of the golf bag on the golf cart, and shifting the center of gravity rearward by means of increasing the incline angle of the golf bag on the golf cart.

Connecting rods 2, 3, 12 and 13 jointly perform the following linkage functions:

(1). When the upper cart frame 5 is rotated downward and toward the lower cart frame 4 in an effort to convert the cart from full size (FIG. 1) to compact size (FIG. 2), the swing arm 1 is simultaneously rotated downward and toward the lower cart frame 4.

(2). When the upper cart frame 5 is rotated upward away from the lower cart frame 4 in an effort to convert the cart from compact size (FIG. 2) to full size (FIG. 1), swing arm 1 is simultaneously rotated away from the lower cart frame 4.

Ultimately, swing arm 1 reaches its final position, i.e., a predetermined angular position that maintains the cart in a balanced state.

(3). After converting the cart from compact size to full size, the golf bag will be loaded on the cart and secured by belt 18. As a result, any rotational movements of connecting rods are prevented, and the swing arm 1 is secured and locked in its final position.

Figure 3:
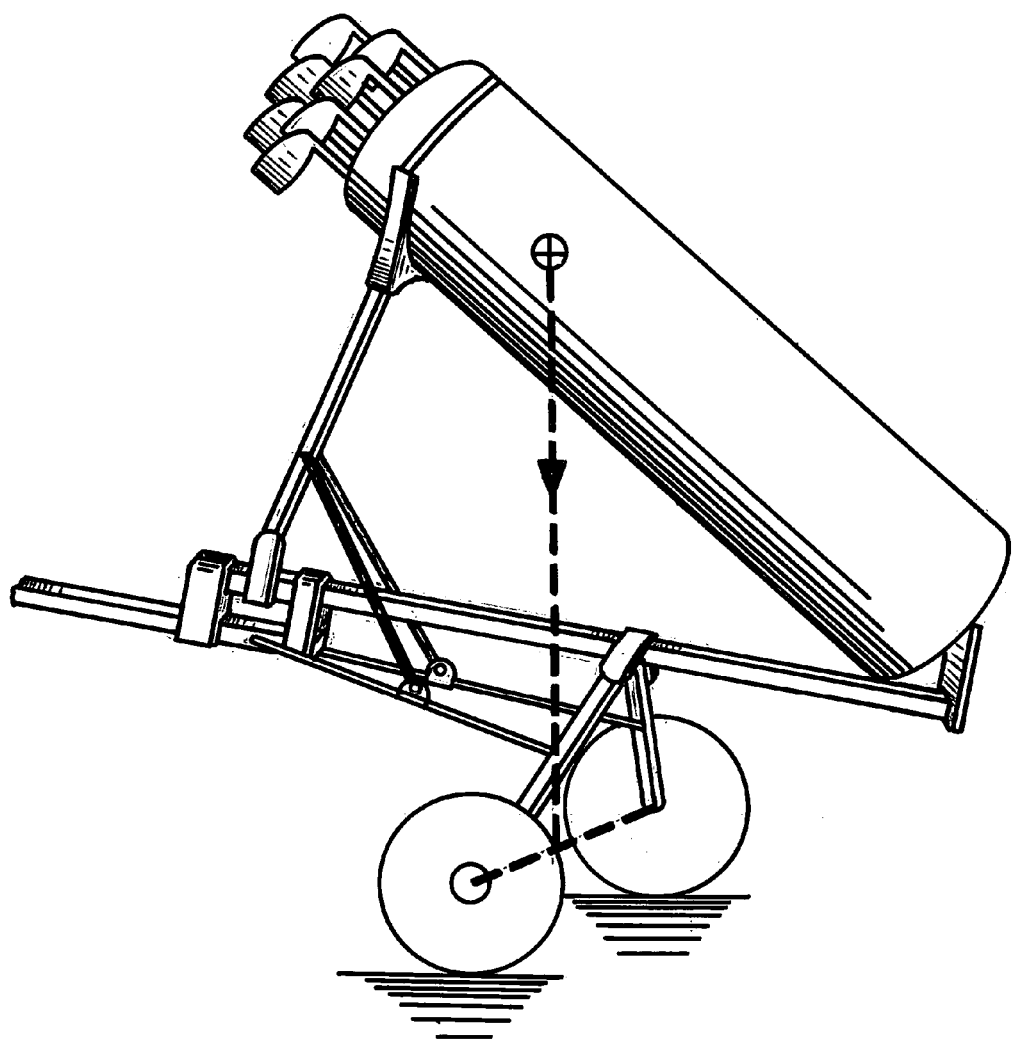
FIG. 3 is an isometric view of the foldable telescope golf cart of the first preferred embodiments of present invention in a full size and balanced state during traveling, in which the center of gravity of the cart including the golf bag and golf clubs falls upon the centerline of the cart wheels.

FIG. 3 shows the foldable telescope golf cart of present invention in a full size and inclined position during traveling. FIG. 3 illustrates the balanced state of the cart, in which the center of gravity of the can falls upon the centerline of the cart wheels.

Figure 4:
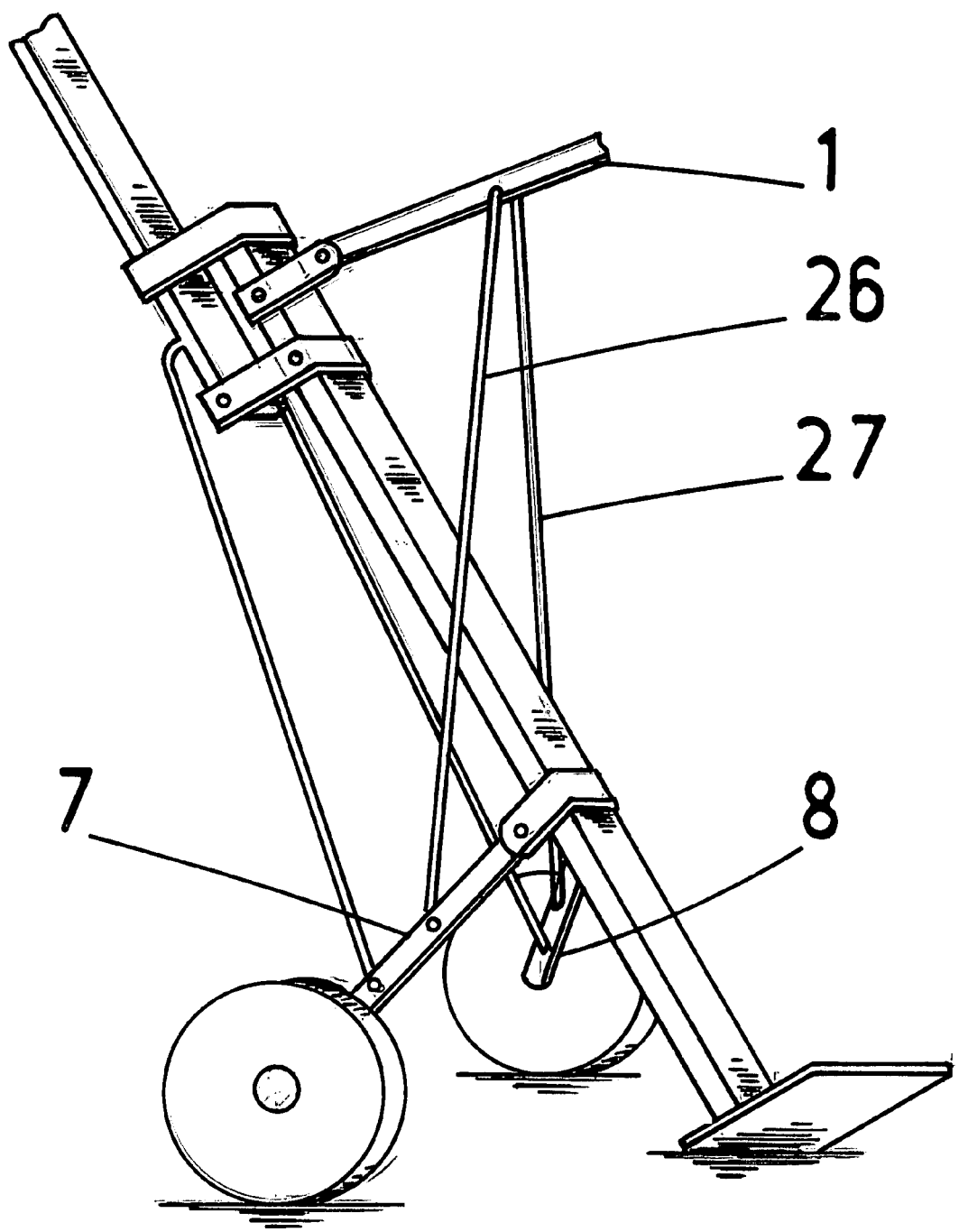
FIG. 4 is an isometric view of the foldable telescope golf cart of the second preferred embodiments of present invention.
Figure 5:
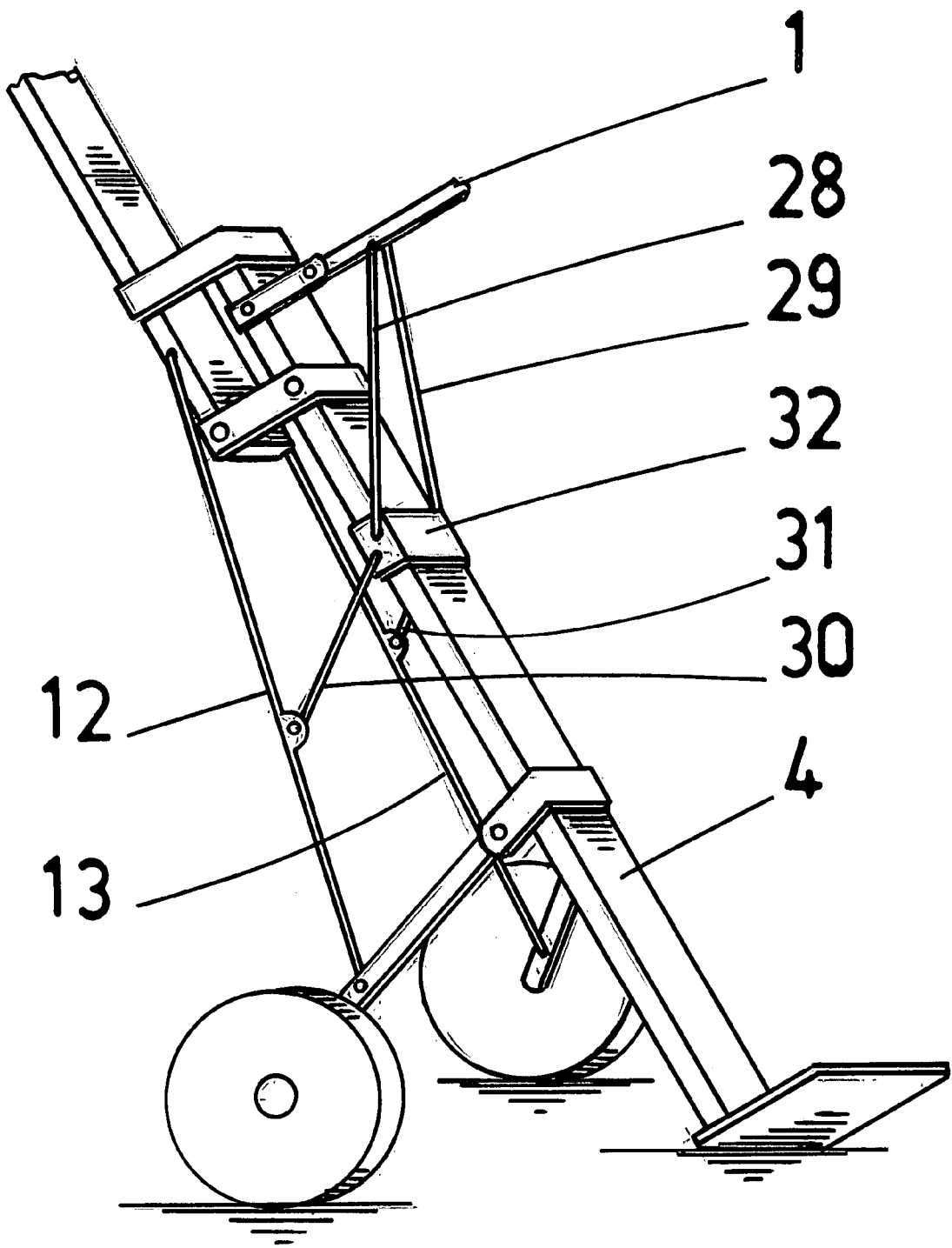
FIG. 5 is an isometric view of the foldable telescope golf cart of the third preferred embodiments of present invention.
Figure 6:
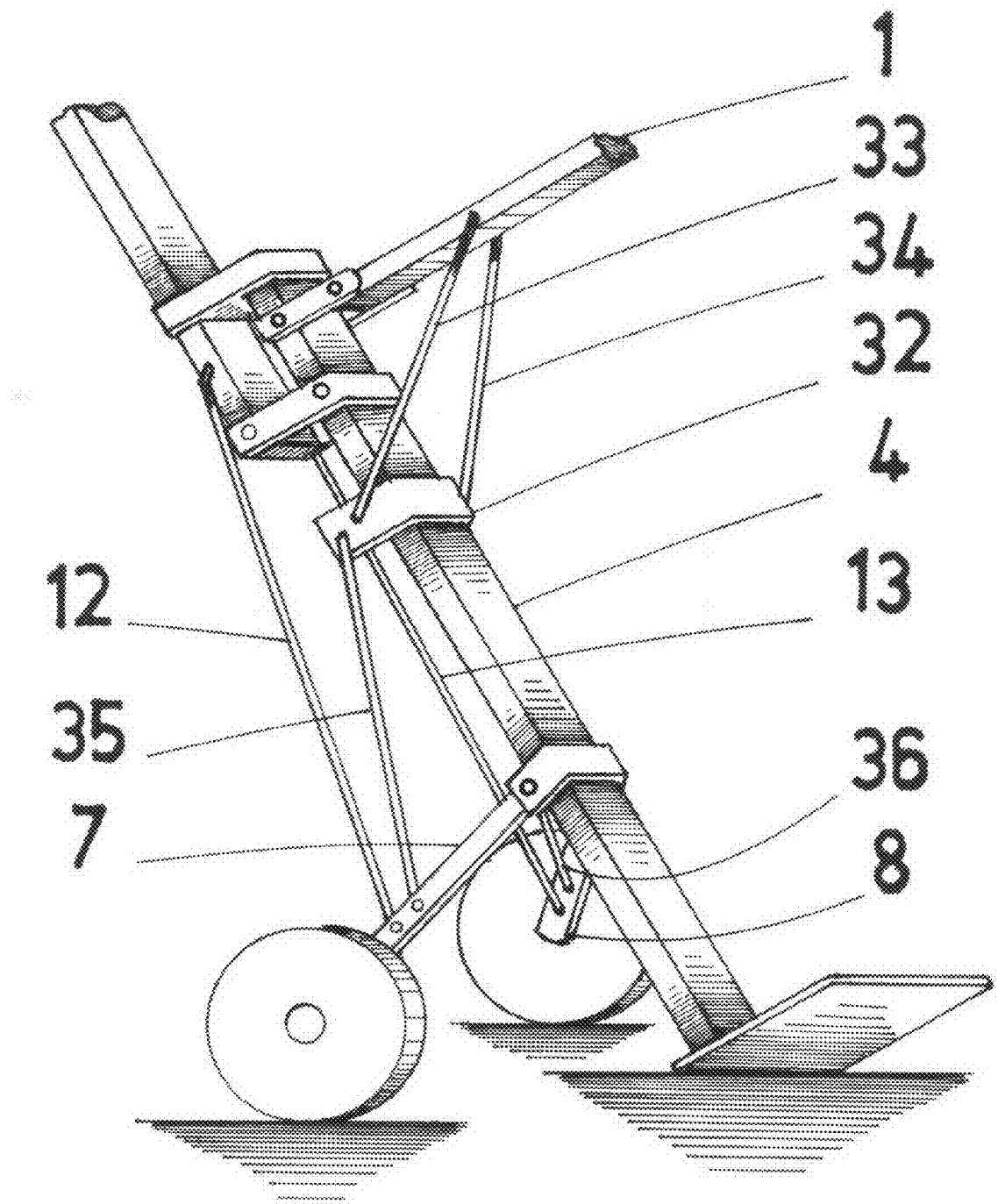
FIG. 6 is an isometric view of the foldable telescope golf cart of the fourth preferred embodiments of present invention.

It is understood that various forms of linkage can be used for achieving the linkage functions performed by connecting rods 2, 3, 12 and 13 in FIG. 1 and FIG. 2. FIG. 4 shows an isometric view of the second preferred embodiments of the telescope golf cart of present invention that comprise of an alternative form of linkage. In FIG. 4, connecting rods 2 and 3 in FIG. 1 and FIG. 2 are now replaced by connecting rods 26 and 27. in which the lower ends of connecting rods 26 and 27 are rotatably connected to wheel frames 7 and 8. FIG. 5 shows an isometric view of the third preferred embodiments of the telescope golf cart of present invention that comprise of another alternative form of linkage. In FIG. 5., connecting rods 2 and 3 in FIG. 1 and FIG. 2 are now replaced by connecting rods 28, 29, 30 and 31. The lower ends of connecting rods 28 and 29 are rotatably connected to a sliding bracket 32. The upper ends of connecting rods 30 and 31 are also rotatably connected to the sliding bracket 32. The lower ends of connecting rods 30 and 31 are rotatably connected to connecting rods 12 and 13 by means of rod fittings in the same manner as illustrated in FIG. 1 and FIG. 2. FIG. 6 shows an isometric view of the fourth preferred embodiments of the telescope golf cart of present invention that comprise of another alternative form of linkage. In FIG. 6, connecting rods 2 and 3 in FIG. 1 and FIG. 2 are now replaced by connecting rods 33. 34. 35 and 36. The lower ends of connecting rods 33 and 34 are rotatably connected to the sliding bracket 32. The upper ends of connecting rods 35 and 36 are also rotatably connected to the sliding bracket 32. The lower ends of connecting rods 35 and 36 are rotatably connected to wheel frames 7 and 8. It is not the intent of the present invention to specify all possible forms of linkage. Therefor, any other forms of linkage different from that of the preferred embodiments of present invention are considered within the scope of the present invention.

It is also understood that synthesis of linkage may yield different results, such as different lengths or dimensions of linkage depending on the geometry of the cart. For example, it is often necessary to first select the locations of rotational joints to avoid interference with free rotation of the connecting rods. This may result in selecting a linkage in different length or shape. It is not the intent of the present invention to specify all possible results. Therefore, dimensions of linkages, or locations of connecting joints different from the preferred embodiments shown in FIG. 1 and FIG. 2 are considered within the scope of the present invention, provided that linkages perform the same function as disclosed by the present invention.

What is claimed is:

1. A foldable golf cart having a balancing mechanism for maintaining said golf cart in a balanced state for carrying a golf bag and golf clubs, comprising:
   a first upper cart frame,
   a second lower cart frame,
   a first mounting bracket that pivotally connects a lower end of said first upper cart frame to an upper end of said second lower cart frame,
   a pair of wheels connected to a respective pair of wheel frames,
   a second mounting bracket that pivotally connects said wheel frame to a mid section of said second lower cart frame,
   a first pair of first and second connecting rods that respectively connect said first upper cart frame to said wheel frames,
   a first plate connected to a lower end of said second lower cart frame for supporting a bottom face of a golf bag
   a third sliding bracket slidably mounted to said first upper cart frame and releasably engageable with a topmost end of said second lower cart frame,
   said third sliding bracket and said first mounting bracket capable of fixing said first upper cart frame and said second lower cart frame in an extended condition when said golf cart is converted from a compact configuration to said extended configuration,
   said third sliding bracket and said first mounting bracket capable of releasing said first upper cart frame from said second lower cart frame when said golf cart is converted from said extended configuration to said compact configuration,
   a swing arm,
   a fourth mounting bracket that pivotally connects a first end of said swing arm to the upper end of said second lower cart frame,
   a saddle fixed to a second end of said swing arm for supporting an upper part of a golf bag,
   a belt connected to said saddle for fastening a golf bag to the saddle,
   a second pair of third and fourth connecting rods, wherein upper ends of the third and fourth connecting rods extend horizontally though a through-hole in a mid section of said swing arm, said through-hole providing a rotational joint of the third and fourth connecting rods with respect to the swing arm,
   a further pair of rotational joints of said third and fourth connecting rods being formed at lower ends of said third and fourth connecting rods wherein a pair of rod fittings are respectively fixedly attached to mid sections of said first and second connecting rods,
   the respective lower ends of the third and fourth connecting rods extending horizontally through respective through-holes provided in each of said rod fittings,
   said first and second connecting rods performing a first linkage function wherein said wheel frame and said first upper cart frame simultaneously rotate downward toward said second lower cart frame when converting said golf cart from said extended configuration to said compact configuration,
   said first and second connecting rods performing a second linkage function wherein said wheel frames and said first upper cart frame simultaneously rotate upward, moving away from said second lower cart frame when converting said golf cart from said compact configuration to said extended configuration,
   said first, second, third and fourth connecting rods jointly performing a third linkage function wherein said first upper cart frame rotates downwards towards said second lower cart frame, and said swing arm simultaneously rotates downwards toward said second lower cart frame when converting said cart from said extended configuration to said compact configuration, said first, second, third and fourth connecting rods jointly performing a fourth linkage function wherein said first upper cart frame rotates upwards away from said second lower cart frame in an extended configuration and said swing arm simultaneously rotates upwards towards a final position when converting said cart from said compact configuration to said extended configuration, the swing arm, in said final position away from the second lower cart frame, supports a golf bag at an inclined angle with respect to said second lower cart frame, locating a center of gravity of said golf cart and golf bag in line with a centerline of said wheel pair, maintaining said golf cart in said balanced state.

2. The foldable golf cart of claim 1, wherein said second pair of third and fourth connecting rods are each a single piece of metal rod.

3. The foldable golf cart of claim 1, wherein said rod fittings on said first pair of first and second connecting rods have a feature preventing said rod fittings from sliding along said first and second connecting rods.

4. The foldable golf cart of claim 1 wherein said rod fittings on said first pair of first and second connecting rods are integral parts of said first and second connecting rods.

5. A foldable golf cart having a balancing mechanism for maintaining said golf cart in a balanced state for carrying a golf bag and golf clubs, comprising:

a first upper cart frame, a second lower cart frame, a first mounting bracket that pivotally connects a lower end of said first upper cart frame to an upper end of said second lower cart frame, a pair of wheels connected to a respective pair of wheel frames, a second mounting bracket that pivotally connects said wheel frame to a mid section of said second lower cart frame, a first pair of first and second connecting rods that respectively connect said first upper cart frame to said wheel frames, a first plate connected to a lower end of said second lower cart frame for supporting a bottom face of a golf bag a third sliding bracket slidably mounted to said first upper cart frame and releasably engageable with a topmost end of said second lower cart frame, said third sliding bracket and said first mounting bracket capable of fixing said first upper cart frame and said second lower cart frame in an extended condition when said golf cart is converted from a compact configuration to said extended configuration, said third sliding bracket and said first mounting bracket capable of releasing said first upper cart frame from said second lower cart frame when said golf cart is converted from said extended configuration to said compact configuration, a swing arm, a fourth mounting bracket that pivotally connects a first end of said swing arm to the upper end of said second lower cart frame, a saddle fixed to a second end of said swing arm for supporting an upper part of a golf bag, a belt connected to said saddle for fastening a golf bag to the saddle, a second pair of third and fourth connecting rods, wherein upper ends of the third and fourth connecting rods extend horizontally though a through-hole in a mid section of said swing arm, said through-hole providing a rotational joint of the third and fourth connecting rods with respect to the swing arm, a further pair of rotational joints of said third and fourth connecting rods being formed at lower ends of said third and fourth connecting rods wherein a fifth bracket is slidably attached to said second lower cart frame and provided with a pair of through holes, said lower ends of said third and fourth connecting rods extend horizontally through respective ones of the pair of through holes in said fifth bracket, the cart further comprising a third pair of fifth and sixth connecting rods, fourth, fifth, sixth and seventh rotational joints are provided by a further pair of through holes in said fifth bracket and a pair of through holes in said wheel frames, upper ends of said fifth and sixth connecting rods extend through said further through holes in said fifth bracket, lower ends of said fifth and sixth connecting rods extend through said through holes in said wheel frames, said connecting rods performing a first linkage function wherein said wheel frame and said first upper cart frame simultaneously rotate downward toward said second lower cart frame when converting said golf cart from said extended configuration to said compact configuration, said connecting rods performing a second linkage function wherein said wheel frames and said first upper cart frame simultaneously rotate upward, moving away from said second lower cart frame when converting said golf cart from said compact configuration to said extended configuration, said connecting rods jointly performing a third linkage function wherein said first upper cart frame rotates downwards towards said second lower cart frame, and said swing arm simultaneously rotates downwards toward said second lower cart frame when converting said cart from said extended configuration to said compact configuration, said connecting rods jointly performing a fourth linkage function wherein said first upper cart frame rotates upwards away from said second lower cart frame in an extended configuration and said swing arm simultaneously rotates upwards towards a final position when converting said cart from said compact configuration to said extended configuration, the swing arm, in said final position away from the second lower cart frame, supports a golf bag at an inclined angle with respect to said second lower cart frame, locating a center of gravity of said golf cart and golf bag in line with a centerline of said wheel pair, maintaining said golf cart in said balanced state.

6. A foldable golf cart having a balancing mechanism for maintaining said golf cart in a balanced state for carrying a golf bag and golf clubs, comprising:

a first upper cart frame, a second lower cart frame, a first mounting bracket that pivotally connects a lower end of said first upper cart frame to an upper end of said second lower cart frame, a pair of wheels connected to a respective pair of wheel frames, a second mounting bracket that pivotally connects said wheel frame to a mid section of said second lower cart frame, a first pair of first and second connecting rods that respectively connect said first upper cart frame to said wheel frames, a first plate connected to a lower end of said second lower cart frame for supporting a bottom face of a golf bag a third sliding bracket slidably mounted to said first upper cart frame and releasably engageable with a topmost end of said second lower cart frame, said third sliding bracket and said first mounting bracket capable of fixing said first upper cart frame and said second lower cart frame in an extended condition when said golf cart is converted from a compact configuration to said extended configuration, said third sliding bracket and said first mounting bracket capable of releasing said first upper cart frame from said second lower cart frame when said golf cart is converted from said extended configuration to said compact configuration, a swing arm, a fourth mounting bracket that pivotally connects a first end of said swing arm to the upper end of said second lower cart frame, a saddle fixed to a second end of said swing arm for supporting an upper part of a golf bag, a belt connected to said saddle for fastening a golf bag to the saddle, a second pair of third and fourth connecting rods, wherein upper ends of the third and fourth connecting rods extend horizontally though a through-hole in a mid section of said swing arm, said through-hole providing a rotational joint of the third and fourth connecting rods with respect to the swing arm, a further pair of rotational joints of said third and fourth connecting rods at lower ends of said third and fourth connecting rods being provided by a pair of through holes in said wheel frames, the respective lower ends of the third and fourth connecting rods extending horizontally through said through holes in said wheel frames, said first and second connecting rods performing a first linkage function wherein said wheel frame and said first upper cart frame simultaneously rotate downward toward said second lower cart frame when converting said golf cart from said extended configuration to said compact configuration, said first and second connecting rods performing a second linkage function wherein said wheel frames and said first upper cart frame simultaneously rotate upward, moving away from said second lower cart frame when converting said golf cart from said compact configuration to said extended configuration, said first, second, third and fourth connecting rods jointly performing a third linkage function wherein said first upper cart frame rotates downwards towards said second lower cart frame, and said swing arm simultaneously rotates downwards toward said second lower cart frame when converting said cart from said extended configuration to said compact configuration, said first, second, third and fourth connecting rods jointly performing a fourth linkage function wherein said first upper cart frame rotates upwards away from said second lower cart frame in an extended configuration and said swing arm simultaneously rotates upwards towards a final position when converting said cart from said compact configuration to said extended configuration, the swing arm, in said final position away from the second lower cart frame, supports a golf bag at an inclined angle with respect to said second lower cart frame, locating a center of gravity of said golf cart and golf bag in line with a centerline of said wheel pair, maintaining said golf cart in said balanced state.

7. A foldable golf cart having a balancing mechanism for maintaining said golf cart in a balanced state for carrying a golf bag and golf clubs, comprising:

a first upper cart frame, a second lower cart frame, a first mounting bracket that pivotally connects a lower end of said first upper cart frame to an upper end of said second lower cart frame, a pair of wheels connected to a respective pair of wheel frames, a second mounting bracket that pivotally connects said wheel frame to a mid section of said second lower cart frame, a first pair of first and second connecting rods that respectively connect said first upper cart frame to said wheel frames, a pair of rod fittings that are fixedly connected to midsections of said first and second connecting rods, a first plate connected to a lower end of said second lower cart frame for supporting a bottom face of a golf bag a third sliding bracket slidably mounted to said first upper cart frame and releasably engageable with a topmost end of said second lower cart frame, said third sliding bracket and said first mounting bracket capable of fixing said first upper cart frame and said second lower cart frame in an extended condition when said golf cart is converted from a compact configuration to said extended configuration, said third sliding bracket and said first mounting bracket capable of releasing said first upper cart frame from said second lower cart frame when said golf cart is converted from said extended configuration to said compact configuration, a swing arm, a fourth mounting bracket that pivotally connects a first end of said swing arm to the upper end of said second lower cart frame, a saddle fixed to a second end of said swing arm for supporting an upper part of a golf bag, a belt connected to said saddle for fastening a golf bag to the saddle, a second pair of third and fourth connecting rods, wherein upper ends of the third and fourth connecting rods extend horizontally though a through-hole in a mid section of said swing arm, said through-hole providing a rotational joint of the third and fourth connecting rods with respect to the swing arm, a further pair of rotational joints of said third and fourth connecting rods being formed at lower ends of said third and fourth connecting rods wherein a fifth bracket is slidably attached to said second lower cart frame and provided with a pair of through holes, said lower ends of said third and fourth connecting rods extend horizontally through respective ones of the pair of through holes in said fifth bracket, the cart further comprising a third pair of fifth and sixth connecting rods, fourth, fifth, sixth and seventh rotational joints are provided by a further pair of through holes in said fifth bracket and a pair of through holes in said rod fittings, upper ends of said fifth and sixth connecting rods extend through said further through holes in said fifth bracket, lower ends of said fifth and sixth connecting rods extend through said through holes in said rod fittings, said connecting rods performing a first linkage function wherein said wheel frame and said first upper cart frame simultaneously rotate downward toward said second lower cart frame when converting said golf cart from said extended configuration to said compact configuration, said connecting rods performing a second linkage function wherein said wheel frames and said first upper cart frame simultaneously rotate upward, moving away from said second lower cart frame when converting said golf cart from said compact configuration to said extended configuration, said connecting rods jointly performing a third linkage function wherein said first upper cart frame rotates downwards towards said second lower cart frame, and said swing arm simultaneously rotates downwards toward said second lower cart frame when converting said cart from said extended configuration to said compact configuration, said connecting rods jointly performing a fourth linkage function wherein said first upper cart frame rotates upwards away from said second lower cart frame in an extended configuration and said swing arm simultaneously rotates upwards towards a final position when converting said cart from said compact configuration to said extended configuration, the swing arm, in said final position away from the second lower cart frame, supports a golf bag at an inclined angle with respect to said second lower cart frame, locating a center of gravity of said golf cart and golf bag in line with a centerline of said wheel pair, maintaining said golf cart in said balanced state.

* * * * *